US008695109B2

(12) United States Patent
Schotland et al.

(10) Patent No.: US 8,695,109 B2
(45) Date of Patent: Apr. 8, 2014

(54) METHOD AND SYSTEM FOR NEAR-FIELD OPTICAL IMAGING

(75) Inventors: John C. Schotland, Ann Arbor, MI (US); Alexander A. Govyadinov, Warrington, PA (US); George Y. Panasyuk, Fairborn, OH (US)

(73) Assignee: The Trustees Of The University Of Pennsylvania, Philadelphia, PA (US)

( * ) Notice: Subject to any disclaimer, the term of this patent is extended or adjusted under 35 U.S.C. 154(b) by 0 days.

(21) Appl. No.: 13/270,700

(22) Filed: Oct. 11, 2011

(65) Prior Publication Data
US 2012/0096601 A1 Apr. 19, 2012

Related U.S. Application Data

(60) Provisional application No. 61/392,619, filed on Oct. 13, 2010.

(51) Int. Cl.
*G01Q 60/18* (2010.01)
(52) U.S. Cl.
USPC .................................................. 850/30; 850/1
(58) Field of Classification Search
None
See application file for complete search history.

(56) References Cited

U.S. PATENT DOCUMENTS

| | | | |
|---|---|---|---|
| 5,602,820 A * | 2/1997 | Wickramasinghe et al. . | 369/126 |
| 6,628,747 B1 * | 9/2003 | Schotland et al. ............... | 378/43 |
| 6,633,660 B1 | 10/2003 | Schotland | |
| 7,978,343 B2 * | 7/2011 | Sun et al. ....................... | 356/601 |
| 8,089,630 B2 * | 1/2012 | Davis et al. .................... | 356/445 |
| 2003/0110844 A1 * | 6/2003 | Struckmeier et al. ........... | 73/105 |
| 2003/0197120 A1 * | 10/2003 | Miyamoto ..................... | 250/234 |
| 2005/0082474 A1 * | 4/2005 | Wen et al. ...................... | 250/306 |
| 2006/0043276 A1 * | 3/2006 | Saito et al. ..................... | 250/234 |
| 2008/0196761 A1 * | 8/2008 | Nakano et al. ................ | 136/258 |
| 2008/0304061 A1 * | 12/2008 | Ossikovski et al. ........... | 356/301 |
| 2009/0296094 A1 * | 12/2009 | Davis et al. .................... | 356/445 |
| 2010/0039654 A1 * | 2/2010 | Sun et al. ....................... | 356/601 |

OTHER PUBLICATIONS

P. Scott Carney et al.; Applied Physics Letter 77,2798 (2000); DOI: 10.1063/1.1320844.
P. Scott Carney et al.; Computation Lens for the Near Field, Physical Review Letters, vol. 92; No. 16, Apr. 23, 2004.
Patrick C. Chaumet et al.; "Superresolution of Three-Dimensional Optical Imaging by Use of Evanescent Waves", Optics Letters, vol. 29, No. 23, Dec. 4, 2004.
J. Brynmor Davis et al.; Inverse Scattering for Near-Field Scanning Optical Microscopy With Broadband Illumination. Journal of Modern Optics, Apr. 20, 2010.
K.P. Gaikovich, "Subsurface Near-Field Scanning Tomography", Physical Review Letters 98, 193902 (2007).
George Y. Panasyuk et al.; "Nonlinear Inverse Scattering and Three-Dimensional Near-Field Optical Imaging", Applied Physics Letters 89, 221116 (2006).

(Continued)

*Primary Examiner* — Andrew Smyth
(74) *Attorney, Agent, or Firm* — Baker & Hostetler LLP

(57) ABSTRACT

A system and method for optically imaging a sample. The method and system uses a controlled scatterer of light positioned in the near field of a sample. The extinguished power from an incident field, which illuminates both the sample and the controlled scatterer, is then measured as a function of the controlled scatterer position and is used to mathematically reconstruct an image of the sample.

20 Claims, 8 Drawing Sheets

(56) References Cited

OTHER PUBLICATIONS

P. Scott Carney et al.; "Near-Field Tomography Without Phase Retrieval", Physical Review Letters, vol. 86, No. 26, Jun. 25, 2001.
Jin Sun et al.; "Nanoscale Optical Tomography Using Volume-Scanning Near-Field Microscopy", Applied Physics Letters 95, 121108 (2009).
Taubner et al.; Opt. Express 13, 8893 (2005).
N. Anderson et al.; Nano Letters 6, 744 (2006).
A. Cvitkovic et al.; Opt. Express 15, 8550 (2007).
J. Aizpurua et al.; Opt. Express 16, 1529 (2008).
R. Magerle et al.; Physical Review Letters, 85, 2749 (1999).
R. Carminati et al.; Opt. Communication, 116, 316 (1995).
P.S. Carney et al.; Physical Review Letters, 86, 5874 (2001.
I. Belkebir et al.; J. Opt. Soc. Am., A22, 1889 (2005).
Sentenac et al.; Physical Review Letters, 97, 243901 (2006).
P. Li, Optics Letters, 32, 1465 (2007).
J. Sun et al.; J. Applied Physics, 102, 103103 (2007).
D.R. Lytle et al.; Physical Review Letters, E 71, 056610 (2005).
Alexander A. Govyadinov et al.; "Phaseless Three-Dimensional Optical Nanoimaging", Physical Review Letters 103, 213901 (2009).
Gang Bao et al.; Numerical Solution of Inverse Scattering for Near-Field Optics, Optics Letters vol. 32, No. 11, Jun. 1, 2007.

\* cited by examiner

METHOD AND SYSTEM FOR NEAR-FIELD OPTICAL IMAGING

This application claims the benefit of U.S. Provisional Application Ser. No. 61/392,519, filed Oct. 13, 2010, the contents of which are incorporated herein by reference.

This invention was made with government support under grant no. FA9550-07-1-0096 awarded by United States Air Force Office of Scientific Research and grant no. DMR0425780 awarded by National Science Foundation. The government has certain rights in the invention.

BACKGROUND OF THE INVENTION

1. Field of the Invention

The invention is in the field of optical imaging, in particular, noninvasive near-field optical imaging.

2. Description of the Related Technology

Current state of the art optical near-field techniques are capable of obtaining only two-dimensional maps of optical intensity near the surface of a sample. Although in the case of homogeneous samples, such maps can be related to the sample's surface topography, their interpretation for manifestly inhomogeneous samples has proved to be problematic.

In principle, it is possible to extend these techniques in order to obtain three-dimensional studies of a sample's interior by sequentially etching thin layers of a sample starting from the top of the sample and performing near field scans of the sample's exposed surfaces. However, a drawback of this method is that the sample is destroyed and may be contaminated during the etching process.

Thus, near field microscopy is traditionally viewed as a technique for imaging surfaces. However, it has recently demonstrated the capacity to detect subsurface structure. Experiments in which a near-field probe is scanned over a three-dimensional volume outside the sample suggest that information on the three-dimensional structure of the sample is encoded in the measured data. That is, the measured intensity viewed as a function of height above the sample is seen to depend upon the depth of subsurface features. However, the intensity images obtained in this manner are not tomographic, nor are they quantitatively related to the optical properties of the medium.

The above noted difficulties have led to the use of inverse-scattering theory to clarify the precise manner in which three-dimensional sub-wavelength structure is encoded in the optical near field. Results in this direction have been reported for two-dimensional reconstruction of thin samples and also for three-dimensional inhomogeneous media. In either case, solution of the inverse scattering problem generally requires measurements of the optical phase in the form of a near-field hologram. Experimentally such a task is notoriously difficult and has not yet been realized.

A replacement of phase measurements by control of the phase of illuminating fields has also been proposed. In this approach, a collection of measurements of the power extinguished from incident evanescent waves with shifted phases is used to reconstruct the imaginary (absorptive) part of the dielectric susceptibility. Assuming that the experimental challenges of this approach could be resolved and such a technique could be realized, it is still impossible to recover the real part of sample's susceptibility using this technique.

Therefore there is a need in the field for a nondestructive method for optical imaging that does not expose a sample to undesired contaminants. It is also desirable that the method employs simple measurements of optical intensity in far-field and does not require interferometric techniques. The method may also be able to recover both real and imaginary parts of dielectric susceptibility.

SUMMARY OF THE INVENTION

An object of the present invention is optical imaging.

Another object of the present invention is a method for optical imaging using a controlled scatterer.

Still yet another object of the present invention is a system for optical imaging using a controlled scatterer.

An aspect of the present invention may be a method for optical imaging comprising: providing a sample; introducing a controlled scatterer into a near field of the sample; providing an incident field; measuring extinguished power from the incident field; and imaging the sample by using the measured extinguished power as a function of a position of the controlled scatterer.

Another aspect of the present invention may be a system for optical imaging comprising: a controlled scatterer, wherein the controlled scatterer is introduced into a near field of a sample; incident light providing means that provides an incident field; power measuring means that measures power extinguished from the incident field, and imaging means, wherein the sample is imaged using measurements of extinguished power from the incident field as a function of a position of the controlled scatterer.

Still yet another aspect of the present invention may be a method of optical imaging comprising the steps of providing a sample; providing a controlled scatterer and measuring extinguished power obtained for different positions of the controlled scatterer; and reconstructing a complex valued susceptibility of the sample with optical sub-wavelength resolution in three dimensions from the measured extinguished power obtained for different positions of the controlled scatterer distributed on a three-dimensional grid outside a region of the sample.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

An embodiment of the present invention is a nondestructive near-field method for optical imaging of the internal structure of three-dimensional samples. A feature of the present invention is the ability to achieve sub-wavelength resolution. Another feature of the invention is that it does not require measurements of optical phase or require phase-controlled illumination. By application of the present invention, in-depth images of thin samples with unprecedented resolution are obtained and are achievable in near-field microscopy. Furthermore, the method can be employed for noninvasive three-dimensional imaging of nanostructures.

The present invention may be used in the development of tools for three-dimensional imaging of nanostructures. There are multiple potential applications including inspection of semiconductor devices, detection of atoms buried beneath surfaces and characterization of biologically important supramolecular assemblies. Optical methods, especially near-field scanning optical microscopy (NSOM) and its variants, hold great promise for nanoscale imaging due to their subwavelength resolution, spectroscopic sensitivity to chemical composition and nondestructive nature.

Figure 1:
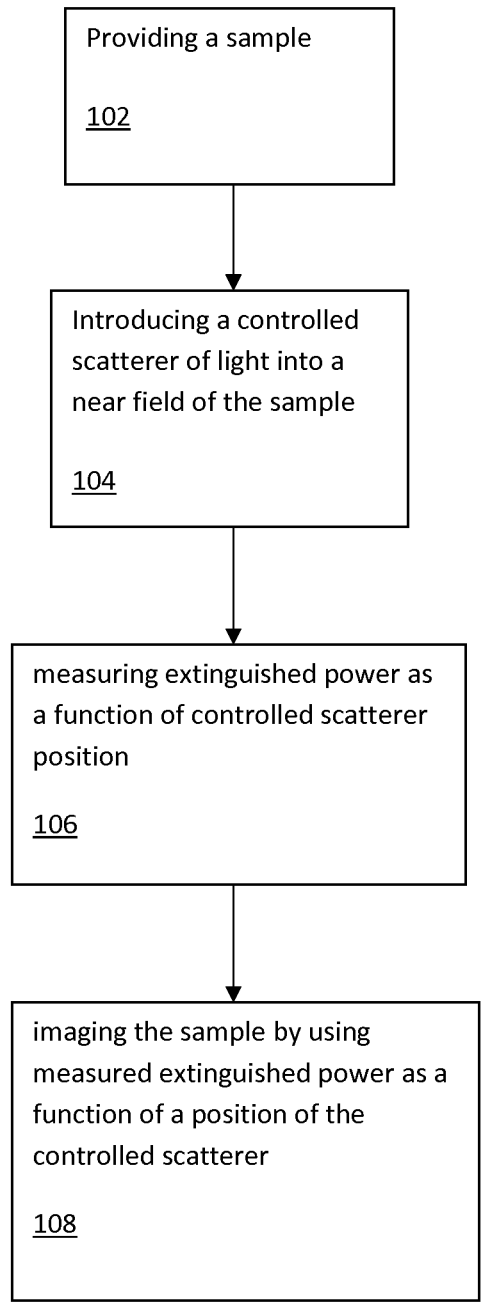
FIG. 1 is a flow chart illustrating a method of optical imaging.
Figure 2:
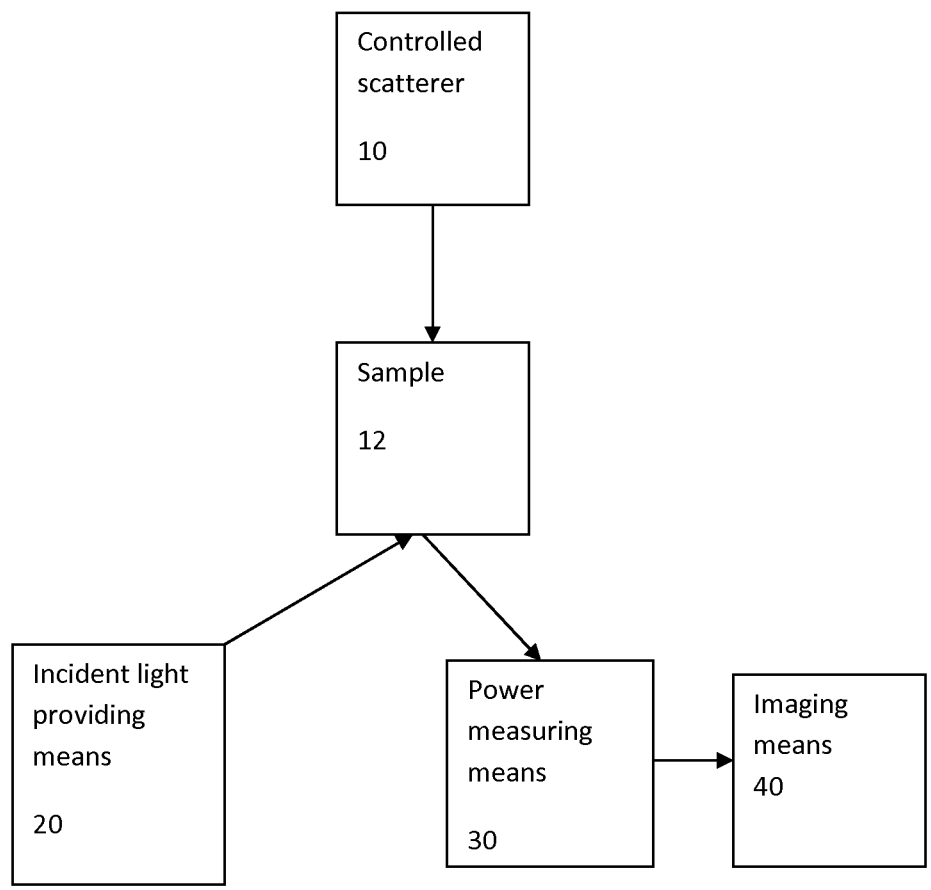
FIG. 2 shows a diagram illustrating the components for optical imaging of the sample.
Figure 3:
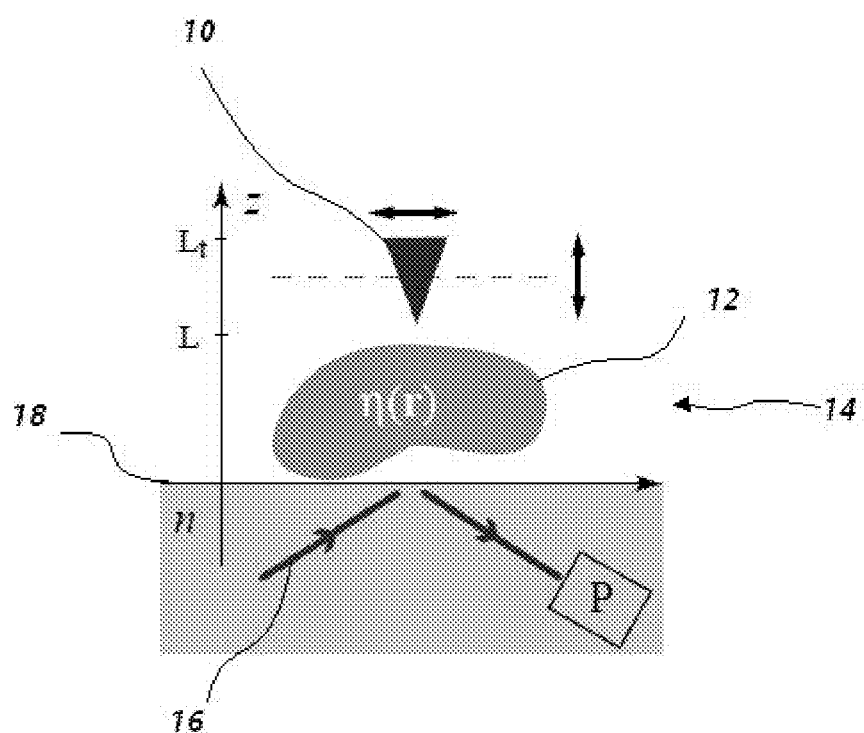
FIG. 3 is a diagram of the system used for optical imaging.

Referring to FIGS. 1-3, the present invention provides a method for nanoscale optical tomography that relies neither on phase measurements of the scattered field nor on phase control of the incident field. The inventive approach enables the reconstruction of the complex-valued dielectric susceptibility with sub-wavelength resolution in three dimensions. As a proxy for the optical phase, a controlled scatterer 10, which could be an atomic force microscopy (AFM) or near field scanning optical microscopy (NSOM) tip, is introduced into the near field 14 of the sample. The power extinguished from the incident field 16, which illuminates the sample 12 and the controlled scatterer 10, is then measured. Since the controlled scatterer 10 is placed externally to the sample 12, changing its position controls the pattern of illumination, which thus modifies the power extinguished from the incident field 16.

The difference between the inventive method and that of conventional holographic techniques is that the interference pattern is regulated by an internal degree of freedom of the system, namely, the position of the controlled scatterer 10 relative to the sample 12, rather than by the external illumination provided by the incident field 16. The burden of phase-resolved measurements or phase-controlled illumination is thus replaced by the problem of controlling the position of the controlled scatterer 10. The inventive method provides nanometer precision via probe positioning that is achievable due to, for example, atomic force microscopy. The precision of positioning the controlled scatterer 10 is used in combination with the simplicity of making the far-field measurements of the extinguished power in order to obtain optical imaging.

FIG. 1 is a flow chart showing the method used in the present invention. FIG. 2 is a diagram of the system used in performing the method shown in FIG. 1. In step 102, a sample 12 is provided for optical imaging. In step 104, a controlled scatterer 10 is introduced into the near-field 14 of a sample 12. The controlled scatterer 10 may be a nano-particle, a scanning near-field or atomic force microscope tip. The controlled scatterer 10 may also be a type of tip. In its broadest sense, the "controlled scatterer" is an object of subwavelength size in at least two dimensions, including but not limited to metallic and dielectric nanoparticles, bow-tie antennas, an AFM tip, a NSOM tip, as well as any combination of the aforementioned objects, such as a NSOM tip with bow-tie antenna deposited at its apex or an AFM tip with a nanoparticle deposited at its apex. It should be understood that the controlled scatterer 10 may encompass any movement with respect to the sample 12.

When introducing the controlled scatterer 10 into the near-field 14, power is extinguished from the incident field 16 that illuminates the sample 12 and the controlled scatterer 10. It is beneficial for the imaging technique to employ a strongly scattering controlled scatterer. A direct way of increasing scattering strength of the controlled scatterer 10 is by increasing its volume. In practice, however, this approach limits the obtainable lateral resolution to about the physical size of the controlled scatterer 10. An alternative way to increase scattering strength is by depositing a nano-particle on the controlled scatterer 10, which can boost scattering by up to several orders of magnitude.

In step 106, the power that is extinguished from the incident field 16 is then measured. The incident field 16 is formed using incident light providing means 20, which may be a monochromatic illumination source with a wavelength of $\lambda$. With non-monochromatic illumination one can probe the properties of the sample at different frequencies by measuring the extinguished power at the wavelengths 2 of interest. For example, one can use a green filter in front of the power measuring means 30 to measure only the extinguished power at this wavelength and then a red filter to obtain information about the sample 12 at that wavelength. Another possibility is to sequentially change the wavelength of the illuminating source and repeat the measurements for each wavelength.

As stated above, the incident light providing means 20 may be a monochromatic illumination source with a set wavelength. The power measuring means 30 may be any detector capable of measuring electromagnetic power at the operating wavelength of the light providing means 20. A suitable power measuring means 30 for IR and visible ranges would be any photodiode or avalanche photodiode in case low light measurements would be necessary.

There is no strict limitation on the electromagnetic frequency that may be employed in the method and system. Ranges that have high importance for applications of this technique are visible, near-IR and mid-IR, and THz. It can however be utilized in any other frequency range in which a suitable source of illumination can be found. This is, in fact, one of the key advantages of this technology over other techniques. Using the inventive method and system one may choose virtually any operating wavelength depending on a particular need. One can even study the sample at different wavelengths and perform spectroscopic analysis of the sample at the same time.

Since the controlled scatterer 10 is located externally to the sample 12, changing its position controls the pattern of illumination, which thus modifies the power extinguished from the incident field 16. In step 108, the image of the sample 12 is formed with imaging means 40 by using the measured extinguished power as a function of a position of the controlled scatterer 10. Imaging means 40 may comprise a computer or network of computers that are capable of processing the data and forming the images.

The method outlined above is described in the mathematical procedure set forth below. Using the mathematical procedure set forth below, one is able to obtain a reconstruction of the complex valued susceptibility of the sample 12 with sub-wavelength resolution in all three dimensions from a collection of measurements of extinguished power obtained for different positions of the controlled scatterer 10 distributed on a three-dimensional grid outside the region of the sample 12. "Subwavelength resolution" is defined as a resolution that is smaller than the so called "Rayleigh limit" (or "diffraction limit"), i.e. the smallest distance at which two objects can be resolved in a classical optical microscope. For a typical optical microscope this limit depends on the wavelength of the illuminating light source and is $\lambda/2$. Also, it should be understood that other modalities may be employed in the performance of the method some of which are discussed further below.

Now turning to an example of the mathematical procedure used with the method and referring to FIG. 3, the sample 12 is deposited on a planar substrate 18. The lower half-space z<0 is the substrate 18 and is taken to have a constant index of refraction n. The sample 12 occupies the upper half space z≥0 and is assumed to be nonmagnetic. The index of refraction in the upper half-space varies within the sample 12, but otherwise has a value of unity. The upper half-space also contains the controlled scatterer 10, which is placed in the nearfield 14 of the sample 12. The nearfield 14 may be defined as the region where the controlled scatterer 10 is scanned within a single wavelength from the sample. Placing the controlled scatterer 10 further away from the sample 12 will result in the loss of ability to obtain subwavelength resolution. The sample 12 and the controlled scatterer 10 are illuminated from below by a monochromatic evanescent plane wave and the power extinguished from the incident field 16 is monitored.

The electric field E in the upper half-space obeys the reduced wave equation $$\nabla \times \nabla \times E(r) - k_0^2 E(r) = 4\pi k_0^2 [\eta(r) + \chi(r)] E(r) \quad (1)$$

Where $\eta$ is the, generally, complex dielectric susceptibility of the sample 12, $\chi$ is the susceptibility of the controlled scatterer 10, $k_0 = 2\pi/\lambda$ is the free-space wave number and the field obeys the necessary interface and boundary conditions. The field is taken to consist of two parts, $E = E_i + E_s$, where $E_i$ is the incident field 16 and $E_s$ is the scattered field. The incident field 16 obeys Eq. (1) in the absence of the sample 12 and the controlled scatterer 10. The scattered field obeys the integral equation (2):

$$E_s(r) = k_0^2 \int \overline{G}(r,r') \cdot E(r')[\eta(r') + \chi(r')] d^3r' \quad (2)$$

where $\overline{G}$ is the half-space Green's tensor. The power $P_e$, extinguished from the illuminating field can be obtained using the generalized optical theorem:

$$P_e = \frac{k_0 c}{2} \text{Im} \int_V E_i^*(r) \cdot E(r)[\eta(r) + \chi(r)] d^3r \quad (3)$$

where the integration is performed over the volume V, which contains both the sample 12 and the controlled scatterer 10. If the controlled scatterer 10 is a strongly scattering, possibly metallic, nanoparticle and the sample 12 is a weakly scattering dielectric then the electric field may be computed perturbatively, accounting for all orders of scattering from the tip and one order of scattering from the sample 12. The resulting perturbation series may then be resumed and, neglecting contributions arising solely from the sample 12 or the controlled scatterer 10, the series will consist of a sum of three terms. The first term, or "TS" term, corresponds to scattering from the controlled scatterer 10 and then from the sample 12. The second term, or "ST" term, is due to scattering from the sample 12 and then from the controlled scatterer 10. The third term, or "TST" term, arises from scattering first from the controlled scatterer 10, then from the sample 12 and finally from the controlled scatterer 10. Note that two additional terms originating solely from scattering by the sample 12 or the controlled scatterer 10 contain no structural information and will be omitted. In practice they can be removed by calibration. To proceed further, a model is specified for the controlled scatterer 10. The controlled scatterer 10 is treated as a small scatterer with susceptibility $\chi(r) = \alpha_0 \delta(r - r_t)$ where $r_t$ is the position of the controlled scatterer 10 and $\alpha_0$ is its polarizability. Re-summation of the perturbation series, as explained above, leads to a renormalization of the polarizability of the controlled scatterer 10 of the form $$\alpha = \frac{\alpha_0}{1 - 2ik_0^3 \alpha_0/3}$$

This result includes radiative corrections to the Lorentz-Lorenz form of the polarizability but neglects the dependence on the height of the controlled scatterer 10 above the interface. The corresponding corrections are typically small but can be accounted for if such is necessary.

It follows from Eq. (3) that the extinguished power can be expressed as a sum of contributions of ST, TS and TST terms:

$$P_e(r_t) = \frac{ck_0^3}{4i} \int \sum_{p=1}^{2} K^{(p)}(r_t, r) \eta^{(p)}(r) d^3r \quad (4)$$

where $\eta^{(1)}(r) = \eta^{(2)*}(r) = \eta(r)$, the kernels $K^{(p)}(r_t, r)$ are defined by:

$$K^{(1)}(r_t, r) = -K^{(2)*}(r_t, r) = \alpha E_i^*(r_t) \cdot \overline{G}(r_t, r) \cdot E_i(r) + \alpha E_i^*(r) \cdot \overline{G}(r, r_t) \cdot E_i(r_t) + \alpha^2 k^2 E_i^*(r_t) \cdot (\overline{G}(r_t, r) \overline{G}(r, r_t)) \cdot E_i(r_t) \quad (5)$$

and the dependence of the extinguished power on the position of the controlled scatterer 10 has been made explicit.

It is assumed that the sample 12 occupies the region $0 \leq z \leq L$ and that it is illuminated by a plane wave of the form $E_i(r) = E_0 \exp(iq_i \cdot \rho + k_z z)$. Here $r = (\rho, z)$ and the field has amplitude $E_0$, transverse wave vector $q_i$, and $k_z = \sqrt{k_0^2 - q_i^2}$. The extinguished power is measured for a discrete set of positions of the controlled scatterer 10 located on a three-dimensional Cartesian grid with transverse spacing h and longitudinal spacing $\Delta z$. Note that the controlled scatterer 10 occupies the region $L < z \leq L_t$ and thus does not overlap the sample.

It proves useful to perform a two-dimensional lattice Fourier transform of the sampled extinguished power in the plane $z = z_t$, namely $$\tilde{P}_e(q, z_t) = \sum_\rho \exp(iq \cdot \rho) P_e(\rho, z_t).$$

Here the sum is carried out over all lattice vectors and q is restricted to the first Brillouin zone (FBZ) of the lattice. Next, we require the plane-wave decomposition of the tensor Green's function:

$$\overline{G}(r, r') = \int \frac{d^2q}{(2\pi)^2} \exp[iq \cdot (\rho - \rho')] \overline{g}_q(z, z') \quad (6)$$

The $\overline{g}_q$ in half-space geometry is given by $\overline{g}_q(z,z') = 2\pi i \overline{S}^{-1}(q) \tilde{g}_q(z,z') \overline{S}(q)$ where $\overline{S}$ is the rotation matrix which rotates k(q) into (xy) plane:

$$\overline{S}(q) = |q|^{-1} \begin{pmatrix} q_x & q_y & 0 \\ -q_y & q_x & 0 \\ 0 & 0 & |q| \end{pmatrix}$$

The non-vanishing components of $\tilde{g}_q$ are given by:

$$\tilde{g}_{xx} = \frac{k_z(q)}{k_0^2} \left( e^{ik_z(q)|z-z'|} + R'(q) e^{ik_z(q)(z+z')} \right)$$

$$\tilde{g}_{yy} = k_z^{-1}(q) \left( e^{ik_z(q)|z-z'|} + R(q) e^{ik_z(q)(z+z')} \right)$$

$$\tilde{g}_{zz} = \frac{q^2}{k_0^2 k_z(q)} \left( e^{ik_z(q)|z-z'|} - R'(q) e^{ik_z(q)(z+z')} \right)$$

$$\tilde{g}_{xz} = -\frac{|q|}{k_0^2} \left( e^{ik_z(q)|z-z'|} - R'(q) e^{ik_z(q)(z+z')} \mathrm{sgn}(z-z') \right)$$

$$\tilde{g}_{zx} = -\frac{|q|}{k_0^2} \left( e^{ik_z(q)|z-z'|} + R'(q) e^{ik_z(q)(z+z')} \mathrm{sgn}(z-z') \right)$$

Where $R(q)=(k_z(q)-k'_z(q))/(k_z(q)+k'_z(q))$ and $R'(q)=(k'_z(q)-n^2 k_z(q))/(k'_z(q)+n^2 k_z(q))$ Making use of this result and carrying out the lattice Fourier transform, we find that Eq. (4) becomes:

$$\tilde{P}_e(q, z_t) = \int_0^L \sum_{p=1}^{2} \tilde{K}^{(p)}(q; z_t, z) \tilde{\eta}^{(p)}(q,z) dz \quad (7)$$

Where $\tilde{K}^{(1)}(q,z_t,z)$ is defined as $$\tilde{K}^{(1)}(q; z_t, z) = \alpha T \Bigg( \gamma E_0^* \cdot \overline{g}_{q_i - q}(z_t, z) \cdot E_0 + \gamma^* E_0^* \cdot \overline{g}_{q_i + q}(z, z_t) \cdot E_0 + \quad (8)$$

$$\alpha k_0^2 \int \frac{d^2 q'}{(2\pi)^2} E_0^* \cdot (\overline{g}_{q'}(z_t, z) \overline{g}_{q+q'}(z, z_t)) \cdot E_0 \Bigg)$$

and $\tilde{K}^{(2)}(q;z_t,z) = \tilde{K}^{(1)*}(-q;z_t,z)$. Here $T=ck_0^3/(4ih^2)\exp[-2\mathrm{Im}k_z z_t]$, $\gamma = \exp[ik_z(z-z_t)]$ and $\tilde{\eta}(q,z) = \int d^2\rho \exp(iq\cdot\rho)\eta(\rho,z)$. Note that for fixed q, Eq. (7) defines a one-dimensional integral equation for $\tilde{\eta}^{(p)}(q,z)$.

The inverse scattering problem considered consists of recovering $\eta^{(p)}$, for p=1, 2, from measurements of $P_e$. This corresponds to solving the integral equation (7). If it is known, a priori, that the susceptibility $\eta$ is purely real or imaginary, then the inverse problem is formally determined and the solution to Eq. (7) is readily obtained by singular value decomposition. However, if $\eta$ is complex valued, the inverse problem is underdetermined. To resolve this difficulty, it is necessary to introduce additional data, in the form of a second set of measurements. That is, two sets of measurements must be carried out for each location of the tip, yielding $\tilde{P}_{e1}$ and $\tilde{P}_{e2}$, one for each incident plane wave with transverse wave vectors $q_{1,2}$ and amplitudes $E_{1,2}$ respectively. In this manner, it is possible to reconstruct both $\eta$ and $\eta^*$ simultaneously, which is equivalent to recovering the real and imaginary parts of $\eta$. We find that the solution to the integral equation (7) is given by the formula:

$$\tilde{\eta}^{(p)}(q,z) = \sum_{z_t,z_t'} \sum_{i,j} \tilde{K}_i^{(p)*}(q;z_t,z) M_{ij}^{-1}(q;z_t,z_t') \tilde{P}_{ej}(q,z_t') \quad (9)$$

where i,j=1,2 label the incident waves. Here $M_{ij}^{-1}$ is the inverse of the matrix whose elements are given by:

$$M_{ij}(q;z_t,z_t') = \int_0^L \sum_p \tilde{K}_i^{(p)}(q;z_t,z) \tilde{K}_j^{(p)*}(q;z_t',z) dz \quad (10)$$

An inverse Fourier transform is applied to obtain a transversely bandlimited approximation to $\eta(r)$ with bandwidth $2\pi/h$. The computation of the inverse of the matrix M is unstable due to the presence of small eigenvalues. $M^{-1}$ is regularized according to the formula:

$$M^{-1}(q;z,z') = \sum_\ell R(\sigma_{q\ell}) \phi_{q\ell}(z) \phi_{q\ell}^*(z') \quad (11)$$

where $\phi_{q\ell}$ is an eigenfunction of M with eigenvalue $\sigma_{q\ell}^2$ and R is a regularization function. One particular choice of the regularization is $R(\sigma_{q\ell}) = \sigma_{q\ell}^{-2} \Theta(\sigma_{q\ell}^2 - \delta)$ where the step function $\Theta$ serves to cut off eigenvalues that are smaller than $\delta$. With the above choices, the solution to the inverse problem is the unique minimum $L^2$-norm solution of equation (7). The inverse problem that is considered is in the same class as the inversion of the Laplace transform. Regularization of $M^{-1}$ restores stability, consistent with the requirement that the resolution in the transverse direction is set by the lattice spacing h and in the longitudinal direction by $\Delta z$.

The particular value of the cut-off parameter depends on numerous factors, such as the amount of noise in the forward data, imperfections of physical models, precision of the numerical algorithm, etc. Here we will visually estimate the quality of the reconstruction and choose it such that the particular features are clearly visible. In practice, we expect that the value of $\delta$ can be found experimentally via calibration with known samples.

Figure 4:
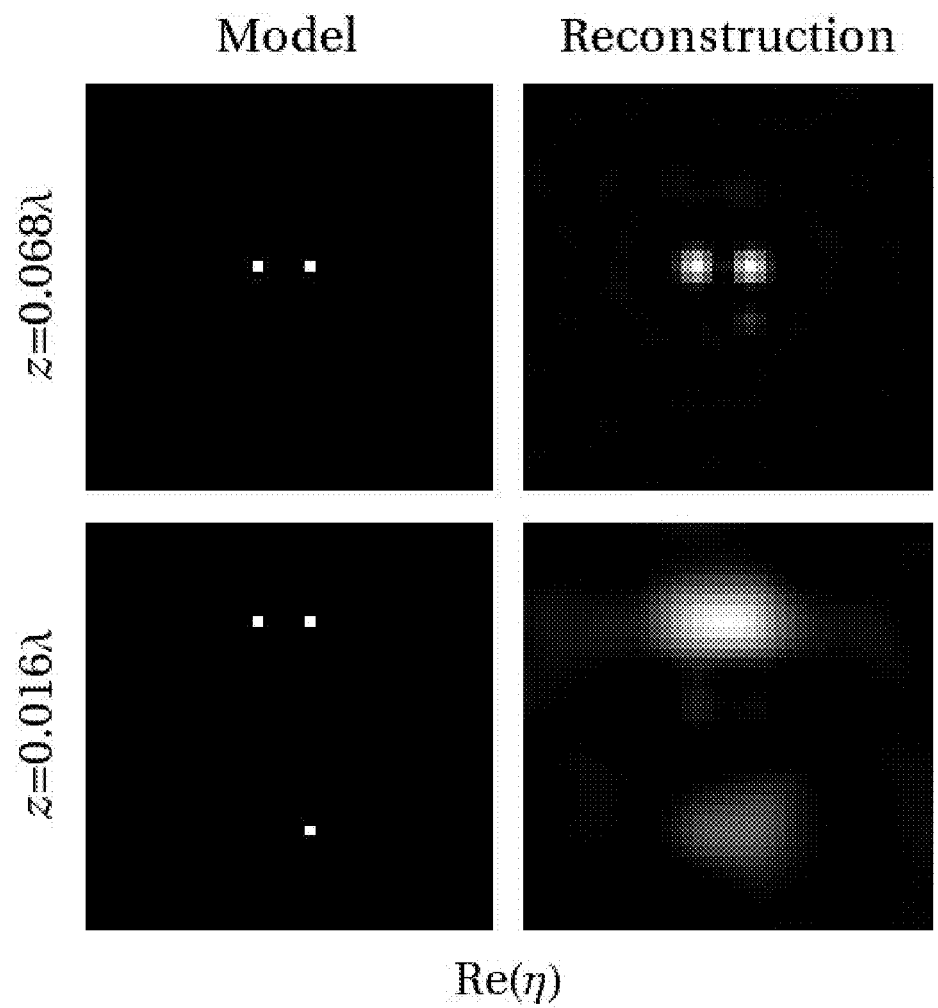
FIG. 4 shows a model and simulated reconstruction of $Re(\eta)$.
Figure 5:
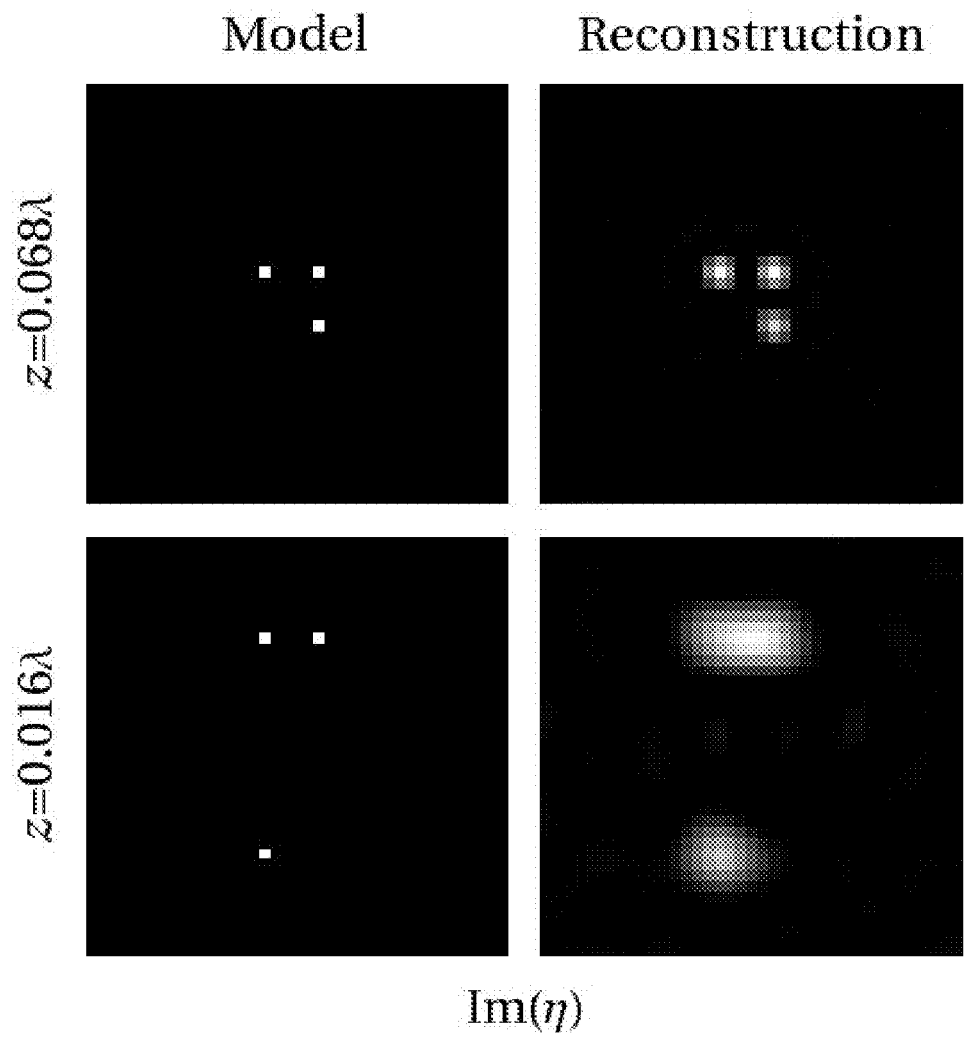
FIG. 5 shows a model and simulated reconstruction of $Im(\eta)$.

To demonstrate the feasibility of the inversion, FIGS. 4 and 5 show a numerically simulated reconstruction of $\eta(r)$ for a collection of point scatterers. The left columns in FIGS. 4 and 5 show the configuration of these scatterers in the sample 12. The controlled scatterer 10 was modeled as a small sphere of bare polarizability $\alpha_0 = (\epsilon - 1)/(\epsilon + 2) R^3$ with radius $R = 8 \times 10^{-2} \lambda$ and permittivity $\epsilon = -11.39 + 0.13i$, which corresponds to silver at a wavelength $\lambda = 550$ nm. The incident fields 16 were taken to be evanescent plane waves with transverse wave vectors $q_1 = (3.15 k_0/\pi, 0)$ and $q_2 = (0, 3.25 k_0/\pi)$, and vector amplitudes given in the lower half-space $E_1 = (-0.521, -0.714, 0.468)$ and $E_2 = (0.714, -0.507, 0.483)$, respectively. The susceptibility $\eta$ was reconstructed on a 40×40×20 Cartesian grid whose transverse extent was 0.4λ×0.4λ and height in the z direction was 0.08λ. The forward data was calculated from Eq. (7) for the positions of the centers of the controlled scatterer 10 located on the same 40×40 transverse grid with 20 steps of size $\Delta z = 0.001\lambda$ in the z direction, beginning 0.16λ from the substrate. The integral in the kernel was numerically evaluated using a trapezoidal rule with 300 points in each direction, spanning six Brillouin zones. The computation of $M_{ij}^{-1}$ was regularized by setting $\delta = 10^{-11}$ in the step-function regularization. A priori information on the form of the sample 12 is not employed in the reconstructions. In particular, it is not necessary to assume that the sample medium is composed of point scatterers.

FIGS. 4 and 5 also show reconstructions of the real and imaginary parts of η in the right hand columns. Tomographic slices are shown in the planes z=0.016λ and z=0.068λ. It can be seen that the scatterers in the top layer of the sample 12, which are nearest the controlled scatterer 10, are better resolved than the scatterers in the deeper layer of the sample 12. This is due to the decay of high-frequency evanescent waves with depth and is a typical feature of tomographic reconstructions in the near field 14. It may also be observed that the reconstructions of the imaginary part of the susceptibility are of higher quality than those of the real part. This effect may be explained by noting that the extinction of power due to absorption is greater than that due to elastic scattering in the near field 14, since the optical phase changes minimally in the near-zone of the controlled scatterer 10.

Figure 6:
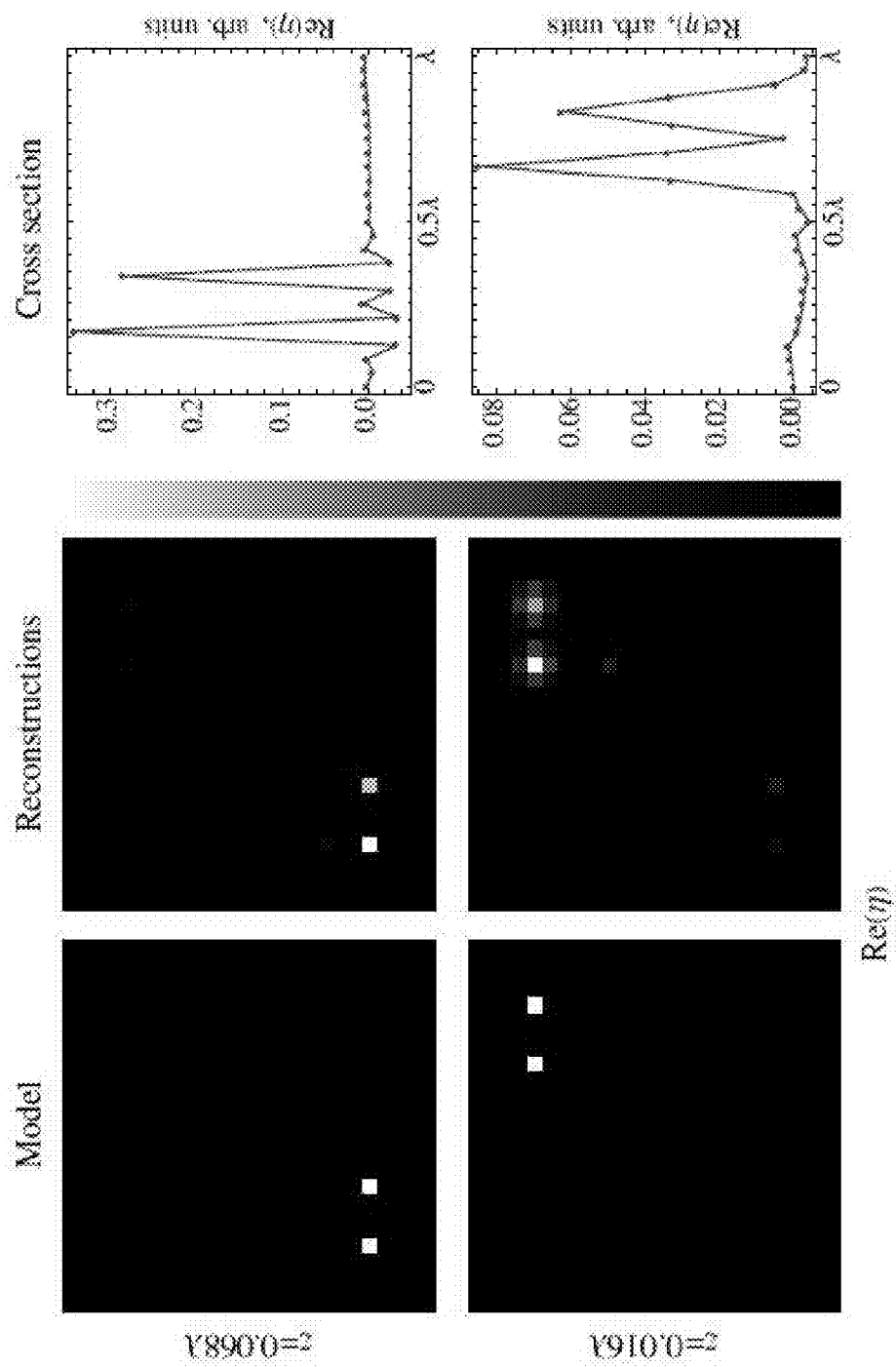
FIG. 6 shows another model and simulated reconstruction of $Re(\eta)$ with different parameters.
Figure 7:
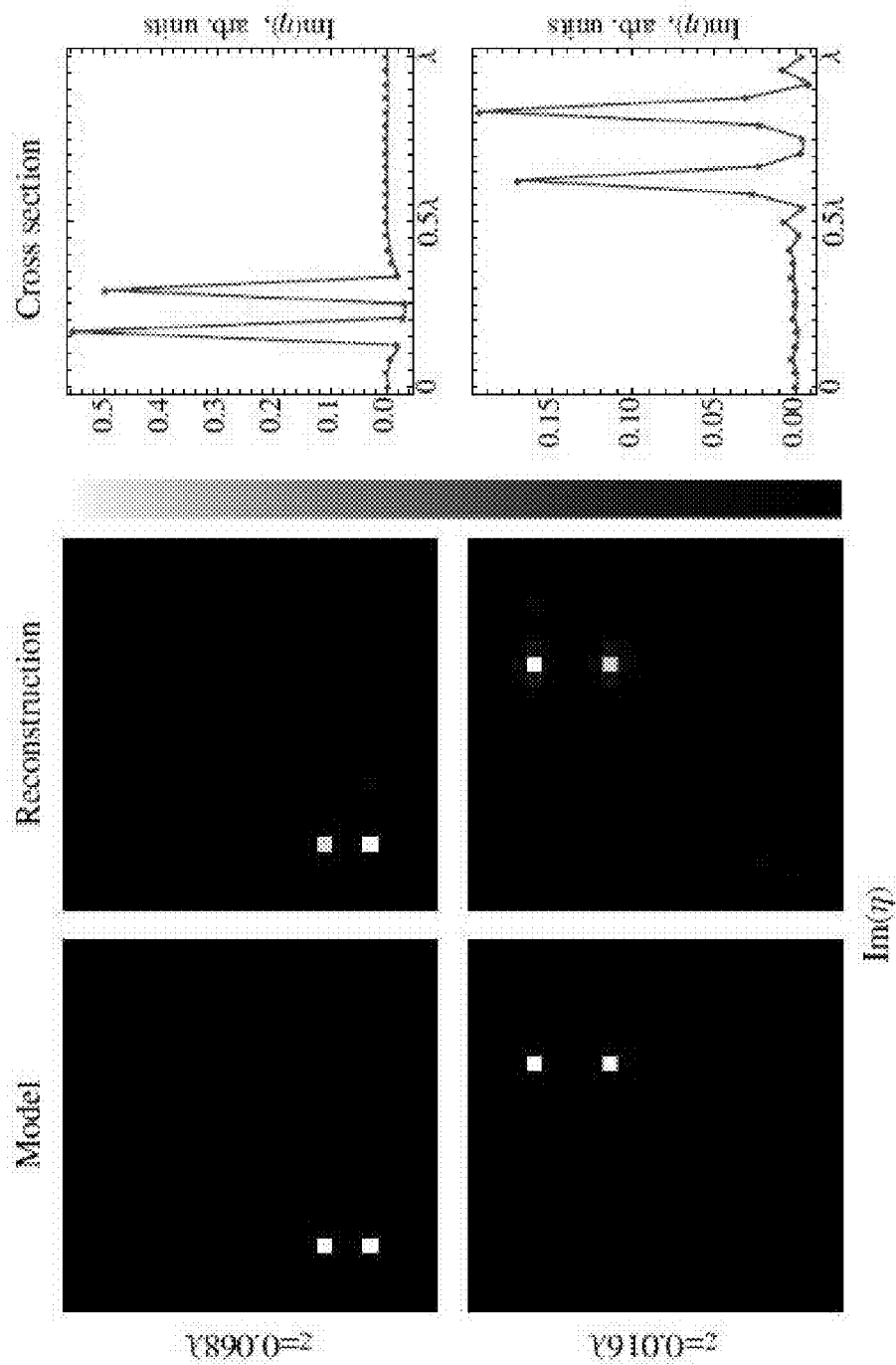
FIG. 7 shows another model and simulated reconstruction of $Im(\eta)$ with different parameters.

FIGS. 6-7 are further examples of employment of the method. FIG. 6 shows the model in the left hand column and the simulated reconstruction of Reη(r). The scatterers in the sample 12 are distributed in two planes at z=0.016λ (top) and z=0.068λ (bottom). Each plane contains three scatterers with real, imaginary or both polarizabilities. Each image is normalized to its own maximum and negative values are cut off. To show the details, only the central portion of the reconstruction with the full field of view of λ×λ is shown. The right column shows the profiles of raw (unnormalized) Reη(r) along the line connecting scatterers which appear in the reconstructions to the left. FIG. 7 is same as in FIG. 6 but showing the Imη(r). Right columns in each figure show the profiles of Reη and Imη, respectively, along the lines connecting the scatterers.

The modeling parameters for the tip in these reconstructions are identical to those used in reconstructions shown in FIG. 4,5. The system was assumed to be illuminated sequentially by two plane waves with transverse wave vectors $q_1=(3.15\,k_0/\pi, 0)$ and $q_2=(0, 3.25\,k_0/\pi)$ and unitary amplitudes of mixed polarization (30% S and 70% P) incident from the substrate of index n=1.5. Such waves become evanescent in the upper half-space region where the sample and the tip are located. The corresponding amplitudes in the upper half plane are $E_1=(-0.022-0.151i, -1.422+0.093i, 2.061 -0.304i)$ and $E_2=(1.348-0.329i, -0.236-0.427i; 1.700-0.916i)$.

The susceptibility η was reconstructed on a 80×80×20 Cartesian grid with the transverse extent of 3.2λ×3.2λ and height of 0.08λ. The forward data were computed from Eq. (7) for the tip positions located on the same transverse grid with 20 steps of size $\Delta z_t=0.001\lambda$ in the z direction, beginning 0.16λ from the substrate. The integral in the kernel (8) was numerically evaluated using a trapezoidal method with 300 points in each direction spanning over six Brillouin zones. The step-function regularization with $\breve{\alpha}=1\times10^{-19}$ was performed. The methods discussed above show that the three-dimensional sub-wavelength structure of an inhomogeneous scattering medium can be recovered from measurements of the extinguished power. Remarkably, neither phase control of the incident field, nor phase measurements of the scattered field are required. The approach of the present invention is based on the solution to the inverse scattering problem for a system consisting of a weakly scattering sample and a strongly scattering controlled scatterer 10. The present invention may be applied to imaging with any wave field for which an apparatus of scattering theory and the optical theorem can be constructed.

Two modalities of the proposed method have been modeled and numerically simulated. The first modality, in which the extinguished power is measured for a set of fixed scatterer positions distributed volumetrically above the sample, is the most straightforward realization of the present invention.

The second modality is specifically designed to work with an atomic force microscope operated in tapping mode, in which the controlled scatterer 10 oscillates in the vertical dimension and the data is collected as the oscillating controlled scatterer 10 scans the volume above the sample. The second method is potentially capable of producing higher quality results.

Figure 8:
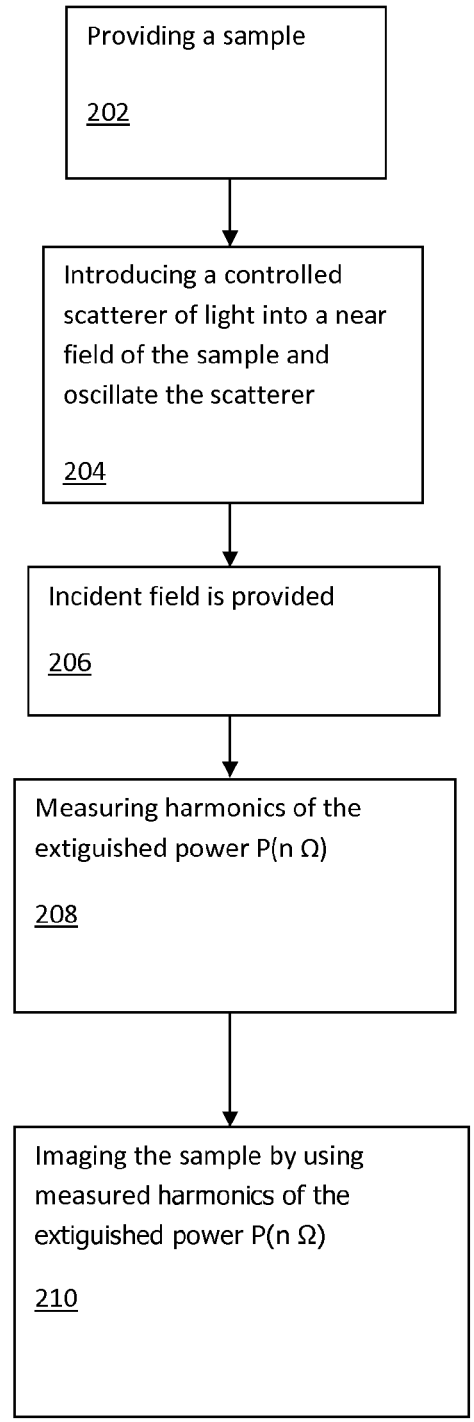
FIG. 8 is a flow chart illustrating an alternative embodiment of a method of optical imaging.

A flow chart illustrating the tapping method for imaging a sample 12 is shown in FIG. 8. In step 202 the sample 12 is provided. In step 204 a controlled scatterer 10 is introduced into the near field 14 of the sample 12 and oscillated. In step 206 an incident field 16 is provided. In step 208 the extinguished power from the incident field 16 is measured. In step 210 the sample 12 is imaged by using the measured Fourier harmonics of the extinguished power as explained in details below.

In the tapping mode the controlled scatterer 10 oscillates around the mean position $z_0$ with amplitude b and frequency Ω. The time dependent position of the tip can be written as:

$$z_t(t)=z_0+b\sin(\Omega t+\phi) \quad (12)$$

where an arbitrary phase shift φ has been included to describe the most general oscillation. The mode-locked measurements of the extinguished power are then performed, typically yielding Fourier components of $P_e(r_t)$. The kernel for the corresponding problem can be obtained by expanding the time-dependent $\tilde{P}_e(q,z_t(t))$ into Fourier series:

$$\tilde{P}_e(q, z_t(t)) = \sum_{n=-\infty}^{\infty} \tilde{P}_n(q, z_0)\exp(in\Omega t) \quad (13)$$

where $\tilde{P}(q,z_0)$ is the n-th Fourier component.

By noticing that $z_t(t)$ enters kernel only in exponents $\exp[i\kappa z_t(t)]$ and recalling that:

$$e^{i\kappa\sin(x)} = \sum_{n=-\infty}^{\infty} J_n(\kappa)e^{inx} \quad (14)$$

The following expression is obtained for $\tilde{K}_n^{(1)}(q;z_0,z)=\tilde{K}_n^{(2)*}(-q;z_0,z)$:

$$\tilde{K}_n^{(1)}(q;z_0,z) = \quad (15)$$
$$\alpha T\Big(\gamma C_n(\kappa_{ST}^{(1)})E_0^* \cdot \overline{g}_{q_i-q}(z_0,z)\cdot E_0 + \gamma^* C_n(\kappa_{TS}^{(1)})E_0^*\cdot\overline{g}_{q_i+q}(z,z_0)\cdot E_0 +$$
$$\alpha k_0^2 \int \frac{d^2q'}{(2\pi)^2} C_n(\kappa_{TST}^{(1)})E_0^*\cdot(\overline{g}_{q'}(z_0,z)\overline{g}_{q'+q}(z,z_0))\cdot E_0\Big)$$

Here $C_n(\kappa)=J_n(\kappa)\exp(in\phi)/\Omega$, $J_n(\kappa)$ is the Bessel function of the first kind and κ are given by:

$$\kappa_{ST}^{(1)}=(k_z(q_i-q)-k_z^*(q_i))b$$

$$\kappa_{TS}^{(1)}=(k_z(q_i+q)+k_z(q_i))b$$

$$\kappa_{TST}^{(1)}=(2iImk_z(q_i)+k_z(q')+k_z(q'+q))b$$

$$\kappa_{ST}^{(2)} = (k_z(q_i+q) - k^*_z(q_i))b$$

$$\kappa_{TS}^{(2)} = (k_z(q_i-q) + k_z(q_i))b$$

$$\kappa_{TST}^{(2)} = (2iImk_z(q_i) + k_z(q') + k_z(q'-q))b \quad (16)$$

While the numerical computations in this case are slightly more time consuming, the significant suppression of the parasitic background signal in the tapping regime is expected to result in improved reconstructions.

As discussed above, advantages of the present invention are that it is capable of being able to recover both real and imaginary parts of dielectric susceptibility and can be much more easily practiced due to its simplicity. The present invention is nondestructive and may be employed without exposing the sample 12 to undesired contaminants. The present invention is based on significantly more simple measurements of optical intensity in far-field and does not require complex interferometric techniques.

The present invention may be readily realized using widely available nano-positioning systems and virtually any NSOM (near-field scanning optical microscope) or AFM (atomic force microscope) platform. Implementations of the proposed technique in NSOM and AFM would significantly improve the imaging capabilities of such devices by adding the third dimension (depth) to these widely-used imaging techniques.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method for optical imaging comprising:
providing a sample;
introducing a controlled scatterer into a near field of the sample whereby changing a position of the controlled scatterer changes a pattern of illumination of said sample;
providing an incident field to illuminate said sample;
measuring extinguished power from the incident field as a function of a position of the controlled scatterer; and
imaging the sample by using the measured extinguished power.

2. The method of claim 1, further comprising controlling the position of the controlled scatterer.

3. The method of claim 1, wherein the controlled scatterer is a nano-particle, a scanning near-field tip, an atomic force microscope tip, a near-field scanning optical microscopy tip, or a bow-tie antenna.

4. The method of claim 1, wherein providing the incident field comprises providing incident light from a monochromatic illumination source having a wavelength $\lambda$ or a non-monochromatic light source that outputs non-monochromatic light through a filter to obtain wavelength $\lambda$.

5. The method of claim 4, wherein measuring the power comprises measuring electromagnetic power at wavelength $\lambda$.

6. The method of claim 1, further comprising oscillating the controlled scatterer.

7. The method of claim 1, wherein the step of imaging comprises reconstructing a complex valued susceptibility of the sample with sub-wavelength resolution in three dimensions from the measured extinguished power obtained for different positions of the controlled scatterer distributed on a three-dimensional grid.

8. The method of claim 1, wherein the step of imaging obtains a sub-wavelength resolution.

9. A system for optical imaging comprising:
a controlled scatterer that is introduced into a near field of a sample and adapted such that changing a position of the controlled scatterer changes a pattern of illumination of said sample;
incident light providing means for providing an incident field that illuminates said sample;
power measuring means for measuring power extinguished from the incident field as a function of a position of the controlled scatterer; and
imaging means for imaging the sample using the measured extinguished power extinguished from the incident field.

10. The system of claim 9, further comprising means for controlling the position of the controlled scatterer.

11. The system of claim 9, wherein the controlled scatterer is a nano-particle, an atomic force microscope tip, or a bow-tie antenna.

12. The system of claim 9, wherein the controlled scatterer is a near-field microscope tip or a near-field scanning optical microscopy tip.

13. The system of claim 9, wherein the incident light providing means is a monochromatic illumination source having a wavelength $\lambda$ or a non-monochromatic light source that outputs non-monochromatic light through a filter to obtain wavelength $\lambda$.

14. The system of claim 13, wherein the power measuring means is a photodiode or an avalanche photodiode adapted to measure electromagnetic power at wavelength $\lambda$.

15. The system of claim 9, wherein the controlled scatterer is an oscillating controlled scatterer.

16. The system of claim 9, wherein the imaging means reconstructs a complex valued susceptibility of the sample with sub-wavelength resolution in three dimensions from measured extinguished power obtained for different positions of the controlled scatterer distributed on a three-dimensional grid.

17. The system of claim 9, wherein the imaging means obtains a sub-wavelength resolution.

18. A method of optical imaging comprising:
providing a sample;
introducing a controlled scatterer into a near field of the sample whereby changing a position of the controlled scatterer changes a pattern of illumination of said sample;
oscillating the controlled scatterer;
measuring extinguished power obtained for different positions of the controlled scatterer; and
reconstructing a complex valued susceptibility of the sample with sub-wavelength resolution in three dimensions from the measured extinguished power obtained for different positions of the controlled scatterer distributed on a three-dimensional grid outside a region of the sample.

19. The method of claim 18, wherein the controlled scatterer is a nano-particle, an atomic force microscope tip, or a bow-tie antenna.

20. The method of claim 18, wherein the controlled scatterer is a near-field microscope tip or a scanning near-field optical microscope tip.

* * * * *